United States Patent
Lacroix et al.

(10) Patent No.: US 6,916,262 B2
(45) Date of Patent: *Jul. 12, 2005

(54) SPORT BALL WITH ENERGY ABSORBING FOAM AT VARYING LOCATIONS

(75) Inventors: Matthew K. Lacroix, Granby, MA (US); Ronald P. Laliberty, Dudley, MA (US); Thomas A. Veilleux, Charlton, MA (US)

(73) Assignee: Russell Asset Management, Inc., Wilmington, DE (US)

( * ) Notice: Subject to any disclaimer, the term of this patent is extended or adjusted under 35 U.S.C. 154(b) by 61 days.

This patent is subject to a terminal disclaimer.

(21) Appl. No.: 10/321,001

(22) Filed: Dec. 17, 2002

(65) Prior Publication Data

US 2003/0130076 A1 Jul. 10, 2003

Related U.S. Application Data (63) Continuation-in-part of application No. 10/210,436, filed on Aug. 1, 2002, now Pat. No. 6,887,173, which is a continuation-in-part of application No. 10/183,337, filed on Jun. 25, 2002, now Pat. No. 6,702,699, which is a continuation-in-part of application No. 09/766,165, filed on Jan. 19, 2001, now abandoned, which is a continuation of application No. 09/594,980, filed on Jun. 15, 2000, now Pat. No. 6,409,618, which is a continuation-in-part of application No. 09/478,225, filed on Jan. 6, 2000, now Pat. No. 6,287,225.

(60) Provisional application No. 60/342,421, filed on Dec. 21, 2001, provisional application No. 60/309,665, filed on Aug. 2, 2001, and provisional application No. 60/159,311, filed on Oct. 14, 1999.

(51) Int. Cl.⁷ .............................................. A63B 37/00

(52) U.S. Cl. ...................................................... 473/593

(58) Field of Search .................................. 473/593, 610, 473/611, 594, 595, 603–605, 607, 608, 609; 446/220, 224

(56) References Cited

U.S. PATENT DOCUMENTS

| | | |
|---|---|---|
| 362,532 A | 5/1887 | Patterson |
| 602,294 A | 4/1898 | Arnold |
| 2,625,770 A | 1/1953 | Steen et al. |
| 2,698,028 A | 12/1954 | Lee et al. |
| 2,737,969 A | 3/1956 | Iknayan |
| 3,020,673 A | 2/1962 | Cooke |
| 3,119,617 A | 1/1964 | Topper |
| 3,229,976 A | 1/1966 | Allen, Jr. |
| 4,568,081 A | 2/1986 | Martin |
| 4,595,200 A | 6/1986 | Shishido |
| 4,776,589 A | 10/1988 | Yang |
| 4,842,563 A | 6/1989 | Russell |
| 4,862,533 A | 9/1989 | Adams, III |
| 4,975,028 A | 12/1990 | Schultz |
| 5,068,933 A | 12/1991 | Sexton |
| 5,098,095 A | 3/1992 | Weiss |
| 5,098,329 A | 3/1992 | Tseng |
| 5,102,365 A | 4/1992 | Wang |
| 5,181,717 A * | 1/1993 | Donntag et al. ............ 473/605 |
| 5,219,162 A | 6/1993 | Orbanes et al. |
| 5,238,244 A | 8/1993 | Cotter et al. |

(Continued)

FOREIGN PATENT DOCUMENTS

WO     WO 93/18826     9/1993

*Primary Examiner*—Steven Wong (57) ABSTRACT

An inflatable sport ball, such as a soccer ball, a volleyball, a basketball, a football or a playground ball, is provided with a self-contained inflation mechanism for inflating or more likely adding pressure to the ball. The mechanism is a pump which is inside the ball and which is operable to pump ambient air into the ball. Energy absorbing foam panels are used at varying locations to maximize rebound performance by minimizing the rebound height differential. The foam panels may be of different types and/or thicknesses.

28 Claims, 4 Drawing Sheets

U.S. PATENT DOCUMENTS

| | | |
|---|---|---|
| 5,375,839 A | 12/1994 | Pagani |
| 5,494,410 A | 2/1996 | Maier-Laxhuber et al. |
| 5,500,965 A | 3/1996 | Hannagan et al. |
| 5,603,131 A | 2/1997 | DeJean, Jr. |
| 5,636,835 A * | 6/1997 | Schindler et al. ........... 473/605 |
| 5,755,634 A | 5/1998 | Huang |
| 5,772,545 A | 6/1998 | Ou |
| 6,287,225 B1 | 9/2001 | Touhey et al. |
| 6,402,647 B1 * | 6/2002 | Haseltine .................... 473/605 |
| 6,409,618 B1 | 6/2002 | Touhey et al. |
| 6,422,960 B1 | 7/2002 | Touhey et al. |
| 6,450,906 B1 | 9/2002 | Touhet et al. |

* cited by examiner

SPORT BALL WITH ENERGY ABSORBING FOAM AT VARYING LOCATIONS

CROSS REFERENCE TO RELATED APPLICATIONS

This application is a continuation-in-part of U.S. patent application Ser. No. 10/210,436, filed Aug. 1, 2002, now U.S. Pat. No. 6,887,173 which is continuation-in-part of U.S. patent application Ser. No. 10/183,337, filed Jun. 25, 2002 now U.S. Pat. No. 6,702,699, which is a continuation of U.S. patent application Ser. No. 09/594,980, filed Jun. 15, 2000, now U.S. Pat. No. 6,409,618, which is a continuation-in-part of U.S. patent application Ser. No. 09/478,225, filed Jan. 6, 2000, now U.S. Pat. No. 6,287,225, which claims the benefit of U.S. Provisional Application No. 60/159,311, filed Oct. 14, 1999. Application Ser. No. 10/210,436 also claims the benefit of U.S. Provisional Application No. 60/309,665, filed Aug. 2, 2001. This application is also a continuation-in-part of U.S. patent application Ser. No. 09/766,165, filed Jan. 19, 2001 now abandoned, which is a continuation-in-part of U.S. patent application Ser. No. 09/594,980, filed Jun. 15, 2000, now U.S. Pat. No. 6,409,618, which is a continuation-in-part of U.S. patent application Ser. No. 09/478,225, filed Jan. 6, 2000, now U.S. Pat. No. 6,287,225. This application also claims the benefit of U.S. Provisional Application No. 60/342,421, filed Dec. 21, 2001.

BACKGROUND OF THE INVENTION

Conventional inflatable sport balls, such as soccer balls, basketballs, footballs, volleyballs and playground balls, may contain a foam layer or layers under the cover layer(s), but the foam layer, if present, is traditionally a layer of foam material that is of uniform thickness and composition. There is no way to control or improve the ball's performance, such as rebound, with the uniform foam layer.

Additionally, conventional inflatable sport balls, such as basketballs, footballs, soccer balls, volleyballs and playground balls, are traditionally inflated through an inflation valve using a separate inflation needle that is inserted into and through a self-sealing inflation valve. A separate pump, such as a traditional bicycle pump, is connected to the inflation needle and the ball is inflated using the pump. The inflation needle is then withdrawn from the inflation valve which self-seals to maintain the pressure. This system works fine until the sport ball needs inflation or a pressure increase and a needle and/or pump are not readily available. A sport ball having maximum performance that also has a self-contained inflation mechanism to add air to the sport ball is needed in the art. For some sport balls, a cover, such as a panel or other portion, over the self-contained inflation mechanism is also desirable. What is needed in the art is a sport ball where the performance characteristics can be altered as desired.

SUMMARY OF THE INVENTION

The present invention relates to sport balls having integral pumps and containing a layer of energy absorbing foam material in at least one location, and a cover, and which also contain mechanisms for inflating or adding pressure to the balls. Preferably, the sport ball contains at least two types of foam and/or different thicknesses of foam wherein one type or area of foam absorbs more energy than at least one other type or area of foam on the ball. The energy absorbing foam material maximizes performance, such as rebound, of the sport balls. The object is to be able to inflate or add pressure to a sport ball without the need for separate inflation equipment such as a separate inflation needle and pump.

Specifically, the invention relates to a sport ball that has a layer of energy absorbing foam in at least one location, and also has a self-contained pump device (or multiple pump devices) that is operable from outside the ball and which pumps ambient air into the ball to achieve the desired pressure. More specifically, the pump device preferably provides a chamber within the ball with means for admitting ambient air into the chamber and provides means for forcing that air from the chamber through a one-way valve means into the interior volume of the ball. In one preferred embodiment, the pump device most specifically comprises a piston and cylinder arrangement with the piston operable from outside the ball.

The present invention also relates to sport balls with integral self-contained inflation mechanisms and energy absorbing foam material in at least one location, and a cover on the ball, wherein the inflation mechanism is covered by a portion of the cover. The portion of the cover that covers the inflation mechanism may be hinged or may have other means of closing, such as hook and loop closure (for example, VELCRO™). The portion of the cover that covers the inflation mechanism may also have a foam layer that may be the same or different as any other foam layer on the ball.

Other objects of the invention will become apparent from the specification, drawings and claims.

DESCRIPTION OF THE PREFERRED EMBODIMENTS

Figure 1:
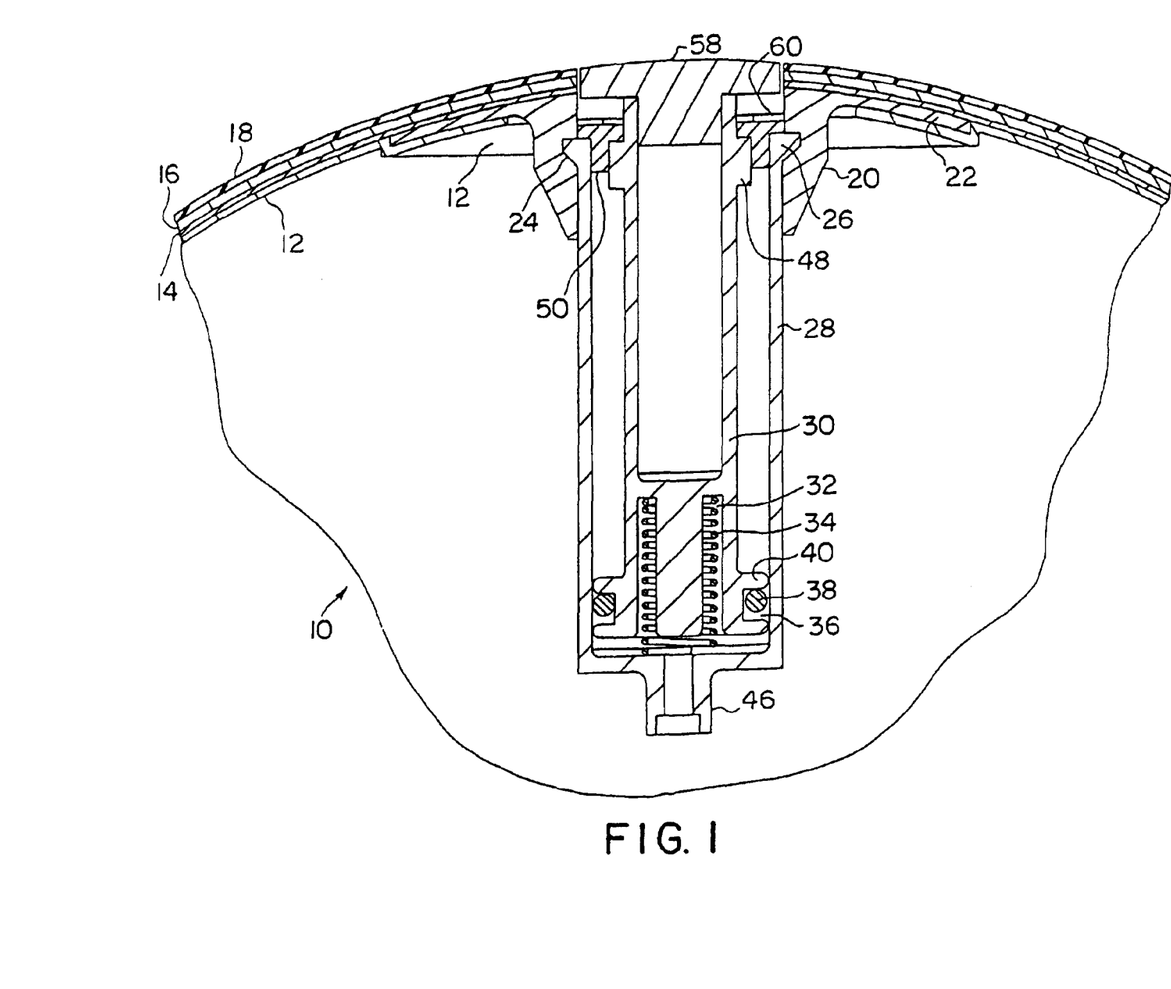
FIG. 1 shows a cross section of a portion of a sport ball with a foam layer and a self-contained pump operable from outside the ball for adding air pressure to the ball.
Figure 2:
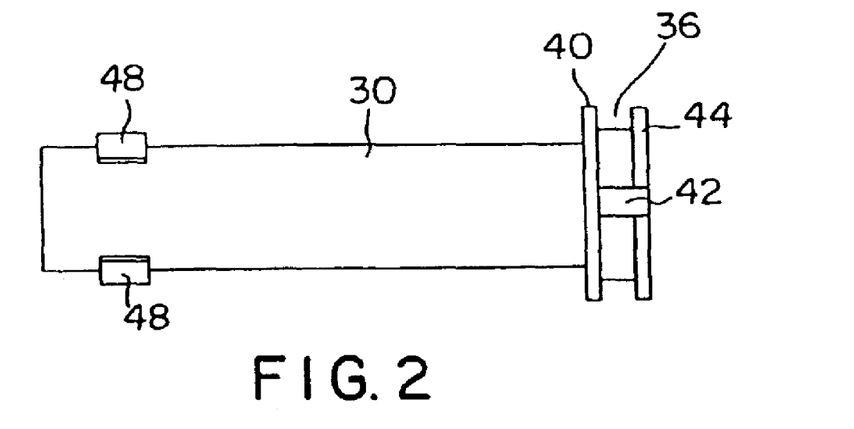
FIG. 2 is a side view of the piston shown in FIG. 1.
Figure 3:
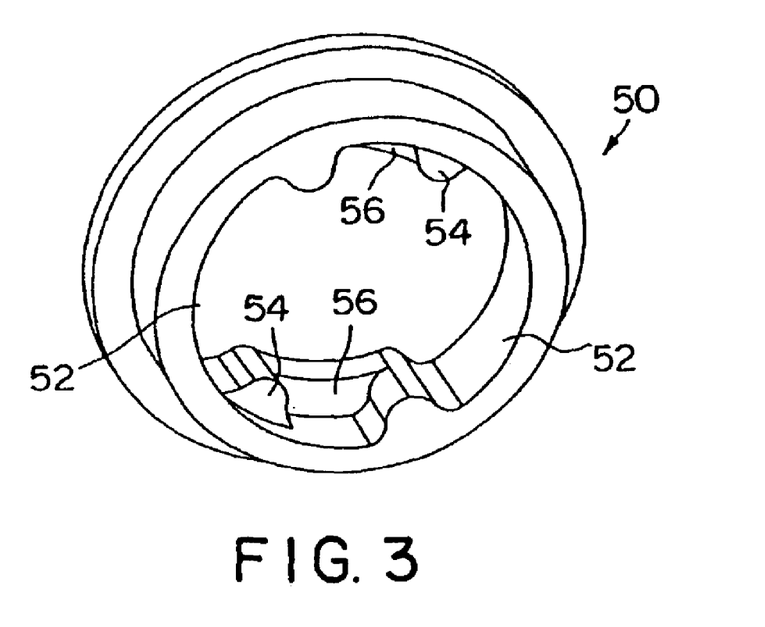
FIG. 3 is an isometric view of the cap for the pump of FIG. 1 showing the configuration for locking and unlocking the pump piston.

Referring first to FIGS. 1 to 3 of the drawings, a portion of a sport ball 10 is illustrated incorporating the energy absorbing foam and one embodiment of a self-contained inflation mechanism of the invention. The ball that is illustrated is a typical soccer ball construction comprising a carcass having a rubber bladder 12 for air retention, a lining or winding layer 14 wrapped around the bladder, a foam layer 16, and an outer layer 18. The outer layer is preferably, but not necessarily, stitched. The outer layer preferably has a foam layer backing 16 or it may be a separate foam layer 16. For a laminated ball, there may be an additional outer layer of leather, synthetic or composite leather panels. The panels may be applied by any process known in the art, such as by applying adhesive and setting by cold molding. The windings, if present, are preferably randomly oriented and two or three layers thick, and they form a layer which cannot be extended to any significant degree and which restricts the ball from expanding to any significant extent above its regulation size when inflated above its normal playing pressure. This layer for volleyballs and soccer balls is sometimes referred to as a lining layer instead of a winding layer, and it may be composed of cotton or polyester cloth that is impregnated with a flexible binder resin such as vinyl or latex rubber. A foam layer 16 is incorporated under the cover layer as previously described. This foam layer 16 is added to the sport ball of the invention control or to change the performance characteristics of the ball. For sport balls with panels, such as a soccer ball or volleyball, the foam layer 16 is incorporated under the panel, and the foam type and/or thickness may vary with each panel, or certain panels, as desired. Alternatively, some panels may have one type of foam while other panels may have another type and/or thickness of foam, depending on the desired properties of the ball, such as rebound height and rebound differential.

Materials suitable for use as the bladder include, but are not limited to, butyl, latex, urethane, and other rubber materials generally known in the art. Examples of materials suitable for the winding layer include, but are not limited to, nylon, polyester and the like. Examples of materials suitable for use as the outer layer, or cover, include, but are not limited to, polyurethanes, including thermoplastic polyurethanes; polyvinylchloride (PVC); leather; synthetic leather; and composite leather. Materials suitable for use as the foam layer include, but are not limited to, NEOPRENE™, SBR, TPE, EVA, or any foam material known in the art that is capable of high or low energy absorption. Examples of commercially available high or low energy absorbing foams include the CONFOR™ open-celled polyurethane foams available from Aearo EAR Specialty Composites, Inc., and NEOPRENE™ (polychloroprene) foams available from Dupont Dow Elastomers. Typical properties of CONFOR™ foams are shown in Table 1 below.

TABLE 1

TYPICAL PROPERTIES OF CONFOR ™ FOAMS

| Property | CF-47 Green | CF-45 Blue | C-42 Pink | CF-40 Yellow | CFNT Yellow |
|---|---|---|---|---|---|
| Density Nominal kg/m$^3$ (lb/ft$^3$) | 93 (5.8) | 96 (6.0) | 91 (5.7) | 93 (5.8) | 80.1 (5.0) |
| Ball Rebound (%) | 2.8 | 2.4 | 1.0 | 0.9 | 4.0 |
| Therm. Cond. - K Value W/m*K (BTU in/hr ft$^2$ F) | .485 (0.28) | .485 (0.28) | .485 (0.28) | .485 (0.28) | .485 (0.28) |
| Compression Set (%) 22 hr at 70° C., | | | | | |
| Compressed 25% | 0.3 | 0.4 | 0.9 | 0.6 | 1.8 |
| Compressed 50% | 0.6 | 0.6 | 1.0 | 2.4 | 6.0 |
| Indentation Force Def. 25% Deflection: 22° C. at 50% Relative Humidity | 43 | 34 | 26 | 15 | 8 |
| Tensile Strength kPa (psi) 51 cm/min at 22° C. | 174 (25.2) | 154 (22.3) | 125 (18.1) | 101 (14.6) | 41 (6.0) |
| Tear Strength kN/m (lbf/in) 51 cm/min at 22° C. | 0.96 (5.5) | 0.81 (4.6) | 0.60 (3.4) | 0.28 (1.6) | 0.26 (1.5) |
| Elongation (%) 51 cm/min at 22 C. | 98 | 108 | 109 | 135 | 149 |

Note: All test methods are ASTM D3574 except Therm. Cond. (ASTM C177)

Aearo EAR Specialty Composites, Inc. (EAR) performs a Ball Rebound % test (Resilience test) according to ASTM D3574. The Resilience test consists of dropping a steel ball from a specified height onto the foam and recording the rebound height of the ball. The value is recorded as a percentage of the original drop height. The following table provides Ball Rebound data and densities of some of these foams:

TABLE 2

REBOUND HEIGHT % and DENSITY OF FOAMS

| Type of Foam | Ball Rebound % - ASTM D3574 | Density kg/m$^3$ (lb/ft$^3$) (ASTM D3574) |
|---|---|---|
| CF-47 Green | 2.8 | 93 (5.8) |
| CF-45 Blue | 2.4 | 96 (6.0) |
| CF-42 Pink | 1.0 | 91 (5.7) |
| CF-40 Yellow | 0.9 | 93 (5.8) |
| CFNT Yellow | 4.0 | 80.1 (5.0) |
| NEOPRENE ™ | Not Available | *165 kg/m$^3$ |
| TPE | Not Available | *135 kg/m$^3$ |

Note: A lower Ball Rebound % indicates a foam with higher energy absorbing capabilities. (The Ball Rebound % of NEOPRENE ™ and TPE are not available.) *The inventors determined these densities.

This invention proposes using at least one energy absorbing foam, and preferably two or more types and/or thicknesses of energy absorbing foams at specified locations in the ball to control the rebound height and rebound differential by increasing or decreasing the rebound height of the ball. The purpose or goal is to achieve a certain rebound height differential (the maximum rebound height minus the minimum rebound height), and preferably, to minimize the rebound height differential.

During testing of sport balls incorporating self-contained inflation mechanisms and foam layers, the inventors found that the ball exhibited an increased rebound height at the valve location. It was determined that using a foam with higher energy absorbing capabilities than the standard foam used in the foam layer (such as NEOPRENE™ foams, which are polychloroprene foams available from DuPont Dow Elastomers) at the valve location would reduce the overall return flight of the ball, thus reducing the rebound height differential. If a greater rebound height is desired, utilizing a lower energy absorbing foam at the desired location, such as at the pump where the rebound height is generally lower, would allow the soccer ball to retain a larger amount of energy, which would increase the rebound at that location. The rebound height, and therefore rebound differential, can be controlled and optimized or minimized by selectively using different types and/or thicknesses of energy absorbing foams.

In one preferred embodiment, incorporated into the carcass of the ball of the invention during the formation is the rubber pump boot or housing 20 with a central opening and with a flange 22 which is bonded to the bladder using a rubber adhesive. The flange is located between the rubber bladder 12 and the lining layer or layer of windings 14. The boot 20 and flange 22 may be constructed of any suitable material, such as butyl rubber, natural rubber, urethane rubber, or any suitable elastomer or rubber material known in the art, or combinations thereof. It is advantageous if the boot 20 and flange 22 are constructed of the same material(s) because the adhesion between them is improved if the materials are the same. Preferably, the boot 20 and flange 22 are constructed of natural rubber, butyl rubber, or a combination of both.

During manufacture of the sport balls, a molding plug may be inserted into the boot opening during the molding and winding process to maintain the proper shape central opening and to allow the bladder to be inflated during the manufacturing process. The molding plug is preferably aluminum, composite or rubber, most preferably aluminum. The central opening through the boot 20 is configured with a groove 24 to hold the flange 26 on the upper end of the pump cylinder 28. The cylinder can optionally be bonded to the boot using any suitable flexible adhesive, such as, but not limited to, epoxy, urethane, cyanoacrylate, or any other flexible adhesive known in the art. The pump cylinder shown in FIGS. 1 and 2 is a right cylinder, but other cylinders, such as a cylinder having a non-circular cross-section, may be used.

In the embodiment shown, located in the pump cylinder 28 is the pump piston 30 that is illustrated in both FIGS. 1 and 2. The piston includes a circular groove 32 at the bottom end which contains the spring 34 that forces the piston up in the cylinder 28. Also at the bottom end of the piston 30 is an O-ring groove 36 containing the O-ring 38. As seen in FIG. 1, this O-ring groove 36 is dimensioned such that the O-ring 38 can move up and down in the groove 36. The O-ring is forced into the position shown in FIG. 1 when the piston 30 is pushed down. In this position, the O-ring seals between the cylinder wall and the upper flange 40 of the groove 36. As shown in FIG. 2, there are recesses or slots 42 in the groove 36 extending from just below the upper flange 40 down through the lower flange 44. Only one of these slots 42 is shown in FIG. 2 but there are preferably two or more. When the piston 30 is forced up by the spring 34, the O-ring 38 moves to the bottom of the groove 36 which opens up a by-pass around the O-ring through the recesses 42 so that the air can enter the cylinder 28 below the piston 30. Then, when the piston is pushed down, the O-ring moves back up to the top of the groove and seals to force the air out through the cylinder exit nozzle 46.

At the upper end of the piston are the two flanges 48 which cooperate with the cylinder cap 50 to hold the piston down in the cylinder and to release the piston for pumping. The cylinder cap 50 is fixed into the top of the cylinder 28 and the piston 30 extends through the center of the cylinder cap. The cap is adhered to the cylinder. FIG. 3 shows an isometric view of the bottom of the cylinder cap 50 and illustrates the open areas 52 on opposite sides of the central opening through which the two flanges 48 on the piston can pass in the unlocked position. In the locked position, the piston is pushed down and rotated such that the two flanges 48 pass under the projections 54 and are rotated into the locking recesses 56. Attached to the upper end of the piston 30 is a button or cap 58 which is designed to essentially completely fill the hole in the carcass and to be flush with the surface of the ball or slightly below the surface, depending on the type of sport ball. This button may be of any desired material such as cast urethane or rubber, such as SANTOPRENE™ rubber, natural rubber, butyl rubber and the like. Preferably, the button is formed from SANTOPRENE™ rubber, available from Advanced Elastomer Systems, Akron Ohio. In one preferred embodiment, the button or cap 58 is co-injected with the piston 30 as one part. Alternatively, the button or cap 58 may be co-injected with a connecting piece, and the button or cap 58 and connecting piece may then be attached to the upper end of the piston 30 using an adhesive suitable for bonding the two pieces together. Co-injecting the button 58 and the piston 30 as one part, or alternatively, the button 58 and the connecting piece (not shown) as one part that is mounted to the piston, provides a more durable part that is less likely to break or come apart during routine use of the ball. The button or cap material and the piston material need to be selected such that the two materials will adhere when co-injected. Testing of various combinations has shown that co-injecting or extruding a soft rubber button, such as a button comprising SANTOPRENE™, and a harder piston, such as polycarbonate or polypropylene and the like, provides a durable bond without the need for adhesives.

The upper surface of the button or cap 58 may be constructed to match the feel of the rest of the ball, if desired. The surface of the button or cap may be textured to increase grip if desired, such as for a basketball. For other balls, such as a soccer ball, the surface may be smooth. For basketballs, it is preferable if the button and pad are flush with the surface, or essentially flush with the surface. For other balls, such as footballs, soccer balls and volleyballs, the button and pad may be slightly recessed.

In a preferred embodiment, fibers or other reinforcing materials may be incorporated into the rubber compound or thermoplastic material used for the button 58 during mixing. Examples of fiber materials suitable for use include, but are not limited to, polyester, polyamide, polypropylene, KEVLAR™, cellulistic, glass and combinations thereof. Incorporation of fibers or other reinforcing materials into the button or cap improves the durability of the button and improves the union of the button or cap and the piston rod, thus preventing the button or cap 58 from shearing off during use. Although the pump would still function without the button, it becomes very difficult to use.

The piston and the connecting piece may be formed of any suitable material, such as, but not limited to, polycarbonate, polypropylene (preferably high impact polypropylene), nylon, ABS, polyphenylene oxide, and the like.

Any desired one-way valve can be used on the exit nozzle 46. For example, a duckbill valve is a common type of one-way valve. Other types of one-way valves may also be used, as long as the valve functions to keep air inside the ball as desired. The one-way valve preferably functions in the conventional manner where inlet air pressure forces the valve open to admit air while the air pressure inside of the ball squeezes the valve closed to prevent the leakage of air.

A pump assembly of the type described and illustrated in FIGS. 1 to 3 is made from materials known in the art. Examples of preferable materials include plastics such as polystyrene, polyethylene, nylon, and polycarbonate, and combinations thereof. Although the assembly is small and light weight, perhaps only about 5 to about 25 grams, it is desirable that a weight be added to the ball structure to counterbalance the weight of the pump mechanism. In a lighter weight or smaller ball, such as a soccer ball, the pump assembly may weigh less and/or be smaller (shorter) than a corresponding pump assembly for a heavier ball, such as a basketball. If a counter weight is used, the ball may have a pump mechanism on one side of the ball and a standard needle valve on the opposite side of the ball where the material forming the needle valve is weighted. Additional material can be added to the needle valve housing or the region surrounding the valve. Alternatively, a dense metal powder such as tungsten could be added to the rubber compound. Other counterweight options may also be used as desired.

Examples of other pump arrangements that may be used with the invention are shown in co-pending application Ser. No. 09/560,768, filed Apr. 28, 2000, and U.S. Pat. Nos. 6,422,960 and 6,450,906, incorporated herein by reference.

Since the pressure in a sport ball can be too high through overinflation or a temperature increase, it is advisable to have a way to bleed pressure from the ball when the conventional inflating needle is not available. One example of such an arrangement may include a bleeding aperture through the carcass of the ball, such as that shown in U.S. Pat. Nos. 6,287,225 and 6,409,618, incorporated herein by reference. Alternatively, the pump may have a mechanism that allows the pressure to be relieved, either through action of the pump, or through the use of a relief mechanism built into the pump, such as a mechanism to open the one-way valve if desired to allow air to flow out of the interior of the ball.

Figure 4:
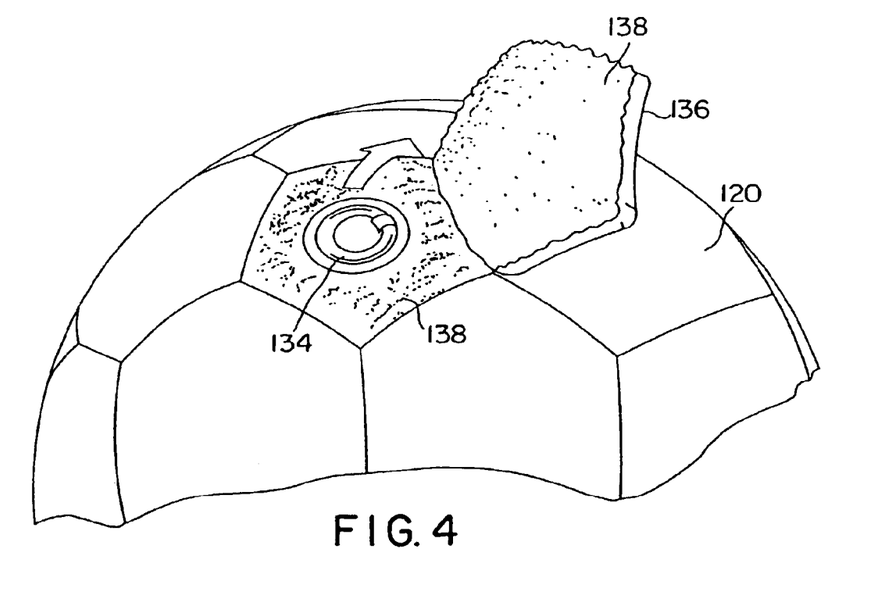
FIG. 4 shows one embodiment of a sport ball of the invention having a cover over the self-contained inflation mechanism.

Some sport balls have covers over the self-contained inflation mechanism, and the covers remain closed while the ball is being used. For other balls, there may be no cover over the pump. FIG. 4 illustrates one embodiment of a sport ball having a cover over the self-contained inflation mechanism. As shown, a flap or panel 136 covers the ball opening. This flap or panel 136 may be held in place by VELCRO™ tape or fabric 138 to prevent it from opening during use. Once the flap has been opened, the pump would be usable. In this embodiment, a flip up pull ring 134 is attached to the upper end of the piston rod. To operate the pump, the pull ring is flipped up, and using a pumping action, air is added to the ball.

Figure 5:
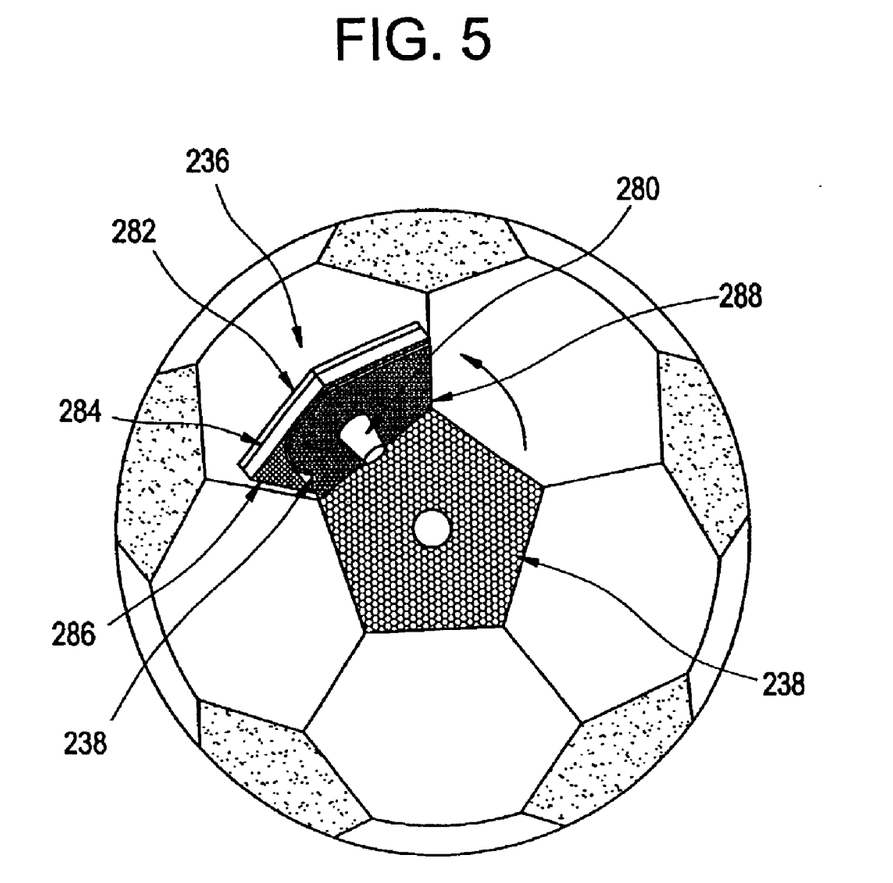
FIG. 5 shows another embodiment of a sport ball of the invention having a cover over a different self-contained inflation mechanism.

Other variations of the pump and cover may be used as well. For example, FIG. 5 shows a pump having a button or cap, as shown in FIG. 1, except that a foam plug 280 fits on top of the button or cap (which is recessed or below the surface of the ball) to improve the feel of the ball in the area of the pump. One panel 236 is stitched to the adjacent panel on one side 288. The panel or cover has a cover material 282, such as leather or polyurethane, a foam layer 284, a fabric layer under the foam layer 286, and a hook and loop (VELCRO™ layer) 238 adhered to the fabric layer. A hook and loop layer 238 is also located on the ball. Other variations of the cover may also be used, such as, for example, rotating locks. Preferably, the flap or panel, if desired, is held in place with a hook and loop closure system, such as VELCRO™.

Sport balls used in competition often must meet certain specifications. For example, the National Basketball Association (NBA) has certain guidelines or specifications that a regulation basketball must meet, such as size, pressure, rebound height differential, and the like. A regulation soccer ball is currently tested against Federated International Football Association (FIFA) specifications in order to qualify as a "FIFA Approved" or "FIFA Inspected" ball. An equivalent certification process is the International Matchball Standard. Some of the tests used by FIFA to determine if a soccer ball is suitable for play include circumference, weight, air retention, rebound, water absorption, durability and balance.

The test methodology for rebound of soccer balls requires that the ball be inflated to 0.8 bar, which is equivalent to 11.6 PSI. The ball is then dropped from 2 meters (78.7 inches) onto a steel plate. The rebound is then recorded by comparing the height of the bottom of the soccer ball (a light can be positioned so the shadow can be recorded) to a fixed scale against the wall. FIFA drops the ball 10 times on the center of different panels. The FIFA Approved level of certification requires that the ball rebounds no less than 120 cm (47.24") and no higher than 165 cm. (64.96"). FIFA allows a differential of 10 cm. (3.94") between the highest and lowest rebound. Early prototypes of the pump soccer ball had a wide rebound distribution. The maximum rebound height minus the minimum rebound height was typically 6 inches or greater, but under a more rigorous testing regimen. Spalding's test consists of 3 to 5 drops at the following locations: the pump, valve, and 90 degrees away from the pump. In addition, the method involves testing from the pump location to a distance five inches away from the pump, in two directions (denoted right and left) in one half to one-inch increments. The inventors found that this test methodology provides a worst case scenario for the rebound differential and allows for a superior product to be created.

EXAMPLES

As previously mentioned, early pump soccer ball prototypes had wide variations in maximum minus minimum rebound heights (the rebound differential). The greatest rebound height was observed at the valve location. This increased rebound height at the valve raised the maximum minus minimum rebound height considerably. Samples were made with the CONFOR™ foams at the valve location. The data shown in Tables 3 and 4 below shows that the maximum minus minimum rebound heights of a ball with 100% NEOPRENE™ foam at all locations had a higher rebound differential than a ball having two types of energy absorbing foam: 6 mm. of CONFOR™ foam at the valve of the ball and NEOPRENE™ at all other locations. The rebound differential improved from 6" to 4" with the use of the CONFOR™ foam at the valve. The CONFOR™ foam is an example of a high energy absorbing foam, and this type of foam absorbs more energy than other types of foam, such as the NEOPRENE™ foam. The decrease in the ball's energy leads to a lower overall return rebound. It has been determined that the use of 6 mm of TPE foam can also decrease the rebound height of the ball by absorbing more energy than other foams, such as NEOPRENE™ foam.

By contrast, the pump location on a soccer ball exhibited lower rebound heights than other locations on the same ball. A lower energy absorbing foam at the pump location would allow the soccer ball to retain a larger amount of energy, which would increase the rebound at the pump.

The use of multiple types and/or thicknesses of foams is a considerable improvement over the ball with only a single type of foam. By placing foams having varying energy absorption capabilities at different locations around the ball, the maximum minus minimum rebound differential can be controlled and optimized or minimized.

A soccer ball inflated to 11.6 psi that had 100% NEOPRENE™ was tested by dropping the ball from a height of 2 meters (78.74 inches) and measuring the rebound height at various locations. The ball was a standard soccer ball (size 5) with a pump installed. A counter weight was installed opposite the pump. The weight of the finished ball, as tested, was 430.3 grams (including the tape to mark the test spots). Rebound data is shown in Table 3 below.

TABLE 3

SOCCER BALL WITH 100% NEOPRENE ™ FOAM PANELS

| Location on ball | Ht. (in.) | Ht. (in.) | Ht. (in.) | Ht. (in.) | Ht. (in.) | Ht. (in.) | Ht. (in.) | Ht. (in.) | Ht. (in.) |
|---|---|---|---|---|---|---|---|---|---|
| Valve | 55 | 56 | 56 | 56 | 56 | 56 | 56 | 56 | 56 |
| Pump | 52 | 52 | 52 | | | | | | |
| 90 Left (7") | 52 | 52 | | | | | | | |
| 90 Right (7") | 52 | 52 | | | | | | | |
| 1" Right of Pump | 50 | 50 | 50 | | | | | | |
| 1.5" Right | 50 | 50 | 50 | | | | | | |
| 2" Right | 52 | 54 | 52 | | | | | | |
| 2.5" Right | 54 | 54 | 54 | 54 | 54 | | | | |
| 3" Right | 54 | 54 | 54 | 54 | 54 | | | | |
| 4" | 52 | 54 | 54 | | | | | | |

TABLE 3-continued

SOCCER BALL WITH 100% NEOPRENE™ FOAM PANELS

| Location on ball | Ht. (in.) | Ht. (in.) | Ht. (in.) | Ht. (in.) | Ht. (in.) | Ht. (in.) | Ht. (in.) | Ht. (in.) | Ht. (in.) |
|---|---|---|---|---|---|---|---|---|---|
| Right 5" | 53 | 54 | 54 | | | | | | |
| Right 1" Left of Pump | 50 | 50 | 50 | | | | | | |
| 1.5" Left | 50 | 50 | 50 | | | | | | |
| 2" Left | 52 | 52 | 53 | | | | | | |
| 2.5" Left | 54 | 54 | 55 | 55 | 56 | | | | |
| 3" Left | 54 | 54 | 54 | 54 | 54 | | | | |
| 4" Left | 54 | 54 | 54 | | | | | | |
| 5" Left | 54 | 54 | 54 | | | | | | |

Table 3 shows that the rebound height of a ball having only one type and thickness of foam, 6 mm of NEOPRENE™ at all locations, varied from 50 inches to 56 inches (a rebound differential of 6 inches).

The second ball, which had 6 mm of CONFOR™ foam at the valve location and 6 mm NEOPRENE™ foam at all other locations was tested in the same manner as the above ball. Rebound height was again measured according to the same procedure. Results are shown in Table 4 below.

TABLE 4

SOCCER BALL WITH CONFOR™ FOAM AT VALVE

| Location on ball | Ht. (in.) | Ht. (in.) | Ht. (in.) | Ht. (in.) | Ht. (in.) |
|---|---|---|---|---|---|
| Valve | 50 | 50 | 50 | 50 | 52 |
| Pump | 50 | 51 | | | |
| 90 Left (7") | 52 | 52 | | | |
| 90 Right (7") | 50 | 52 | | | |
| 1" Right of Pump | 50 | 52 | | | |
| 1.5" Right | 52 | 50 | | | |
| 2" Right | 50 | 50 | | | |
| 2.5" Right | 52 | 52 | 50 | 52 | 51 |
| 3" Right | 54 | 54 | 54 | 54 | |
| 4" Right | 54 | 54 | 53 | 54 | |
| 5" Right | 53 | 52 | 53 | | |
| 1" Left of Pump | 52 | 52 | | | |
| 1.5" Left | 51 | 52 | | | |
| 2" Left | 50 | 50 | | | |
| 2.5" Left | 54 | 52 | 54 | 54 | |
| 3" Left | 54 | 53 | 52 | 54 | 54 |
| 4" Left | 54 | 54 | 54 | 54 | |
| 5" Left | 54 | 54 | 54 | 54 | |

Table 4 shows that the rebound height varied from 50 inches to 54 inches, for a rebound differential of 4 inches. Adding 6 mm of the high energy absorbing foam, CONFOR™, at the valve location reduced the rebound height at this location, thereby lowering the rebound differential. Additional foam types or different thicknesses of foam may be used at other locations to control the rebound differential, as desired.

Additional soccer balls with pumps and having varying foam types and thicknesses were also constructed. Two actual production soccer balls were compared. The first ball had 5 mm of 100% NEOPRENE™ foam at the pump panel, 6 mm of 100% TPE foam at the valve panel, and the remainder of the panels comprised 2 mm of TPE foam and 4 mm of SBR foam. The second soccer ball had the same construction except for the foam layout. The second ball had 5 mm of 100% NEOPRENE™ at the pump panel, and 6 mm of 100% TPE at the rest of the panels. All other parts, such as the cover material, boot material, pump, etc. were the same in both balls. The second ball is a lower cost version of the first ball and has the same rebound differential and good rebound properties, although the rebound range was 4 inches lower than the first ball (rebound of 42 to 50 inches vs. 46 to 54 inches for the first ball). The addition of the SBR foam to the first ball, where a combination of SBR and TPE foam was used, improved and increased the rebound height significantly. Results of the rebound test are shown in Table 5 below.

TABLE 5

SOCCER BALLS WITH VARYING FOAM PANELS

| Location on ball | Ball 1 Ht. (in.) | Ball 1 Ht. (in.) | Ball 1 Ht. (in.) | Ball 1 Ht. (in.) | Ball 2 Ht. (in.) | Ball 2 Ht. (in.) | Ball 2 Ht. (in.) | Ball 2 Ht. (in.) |
|---|---|---|---|---|---|---|---|---|
| Valve | 52 | 53 | | | 48 | 49 | | |
| Pump | 50 | 51 | | | 46 | 47 | | |
| 90 Left (7") | 52 | 53 | | | 48 | 48 | | |
| 90 Right (7") | 52 | 52 | | | 48 | 48 | | |
| 1" Right of Pump | 46 | 46 | | | 42 | 42 | 42 | |
| 1.5" Right | 48 | 48 | | | 43 | 44 | | |
| 2" Right | 52 | 51 | | | 48 | 49 | | |
| 2.5" Right | 54 | 53 | 54 | 54 | 50 | 50 | 50 | |
| 3" Right | 53 | 53 | 54 | 54 | 49 | 49 | 48 | |
| 4" Right | 53 | 54 | | | 48 | 48 | | |
| 5" Right | 52 | 53 | | | 47 | 48 | | |
| 1" Left of Pump | 46 | 46 | | | 42 | 42 | | |
| 1.5" Left | 46 | 48 | | | 45 | 46 | | |
| 2" Left | 52 | 52 | | | 49 | 50 | | |
| 2.5" Left | 53 | 54 | 54 | 54 | 50 | 48 | 48 | 50 |
| 3" Left | 52 | 52 | 54 | | 48 | 48 | 48 | |
| 4" Left | 52 | 53 | | | 48 | 48 | | |
| 5" Left | 52 | 53 | | | 48 | 48 | | |

Note: Balls are dropped from 2 meters (78.74 inches), inflated to 11.6 psi.

Two different volleyballs having pumps were also constructed and tested. The first ball had 5 mm of 100% TPE foam at all panel locations. The second ball had 5 mm of 100% NEOPRENE™ foam at the pump panel and the two panels surrounding the pump, and the valve and remaining panels had 4.5 mm of 100% TPE foam. All other parts, such as the cover material, boot material, pump, etc. were the same in both balls. The first ball, which has the same foam at all panels, is a lower cost version of the second ball. The first ball, which had a layer of foam comprising only one type and one thickness, had a larger rebound differential than the second ball (14 inches). By varying the foam and using two types and thicknesses of foam in the second volleyball, the rebound differential decreased by 5 inches (to 9 inches). Results of the rebound test are shown in Table 6 below.

TABLE 6

VOLLEYBALLS WITH VARYING FOAM PANELS

| Location on ball | Ball 1 Ht. (in.) | Ball 1 Ht. (in.) | Ball 2 Ht. (in.) | Ball 2 Ht. (in.) | Ball 2 Ht. (in.) |
|---|---|---|---|---|---|
| Valve | 57 | 59 | 64 | 65 | |
| Pump | 53 | 55 | 60 | 61 | |
| 1" Right of Pump | 49 | 50 | 60 | 58 | |
| 1.5" Right | 51 | 51 | 58 | 57 | |
| 2" Right | 56 | 58 | 59 | 60 | |

TABLE 6-continued

VOLLEYBALLS WITH VARYING FOAM PANELS

| Location on ball | Ball 1 Ht. (in.) | Ball 1 Ht. (in.) | Ball 2 Ht. (in.) | Ball 2 Ht. (in.) | Ball 2 Ht. (in.) |
|---|---|---|---|---|---|
| 2.5" Right | 60 | 60 | 62 | 62 | 64 |
| 3" Right | 62 | 61 | 62 | 62 | 62 |
| 5" Right | 61 | 61 | 64 | 64 | 64 |
| 1" Left of Pump | 49 | 48 | 56 | 56 | |
| 1.5" Left | 52 | 51 | 56 | 56 | |
| 2" Left | 55 | 57 | 56 | 58 | |
| 2.5" Left | 61 | 61 | 60 | 64 | 64 |
| 3" Left | 59 | 60 | 62 | 64 | 64 |
| 5" Left | 57 | 58 | 62 | 63 | |
| Random Drops | 60 | 60 | | | |

Note: Balls are dropped from 100 inches onto a wooden platform, inflated to 5 psi.

As Table 6 indicates, the second volleyball, which had 5 mm of NEOPRENE™ foam at the pump and the two surrounding panels, and 4.5 mm of TPE foam at the valve, had a higher overall rebound range than the first ball, but the differential was significantly reduced (from 14 inches to 9 inches). This example used the NEOPRENE™ foam as a low energy absorbing foam, as compared to the TPE foam. Since less energy was absorbed at the pump and surrounding panels by the NEOPRENE™ foam than by the TPE foam, the ball retained more energy and the rebound height was greater and also improved dramatically (56 to 65 inches vs. 48 to 62 inches). The first ball, which used only one type and thickness of the energy absorbing foam, had a lower rebound height.

The foregoing description is, at present, considered to be the preferred embodiments of the present invention. However, it is contemplated that various changes and modifications apparent to those skilled in the art may be made without departing from the present invention. Therefore, the foregoing description is intended to cover all such changes and modifications encompassed within the spirit and scope of the present invention, including all equivalent aspects.

What is claimed is:

1. An inflatable sport ball comprising: a carcass;
   an internal pump, said pump including a cylinder having an air outlet into said ball, a one-way valve attached to said air outlet permitting air flow from said cylinder into said ball and preventing air flow from said ball back into said cylinder, means in said cylinder operable to draw ambient air from outside said ball into said cylinder and to force said drawn ambient air from said cylinder though said one-way valve into said ball, and further including means for operating said pump from outside said carcass;
   a layer of energy absorbing foam in at least one location on the ball; and
   a cover.

2. An inflatable sport ball as recited in claim 1 further including a pump actuator comprising:
   a piston having a piston rod attached to said piston and extending through an opening in said carcass and movable between an extended position and an inserted position; and
   means for locking said piston rod in said inserted position.

3. An inflatable sport ball as recited in claim 1 wherein said layer of foam covers essentially the entire ball.

4. An inflatable sport ball as recited in claim 1 wherein said ball includes at least two different types or thicknesses of foam at different locations of the ball.

5. An inflatable sport ball as recited in claim 4 wherein at least one type or thickness of foam absorbs more energy than at least one other type or thickness of foam.

6. An inflatable sport ball as recited in claim 4 wherein said sport ball comprises at least two types of thicknesses of energy absorbing foam has a lower rebound differential than a sport ball having all other components the same except the foam types or thicknesses.

7. A inflatable sport ball as recited in claim 1 and further including means attached inside said ball to counterbalance the weight of said internal pump.

8. An inflatable sport ball as recited in claim 1 and further including means for bleeding air pressure from said ball.

9. An inflatable sport ball as recited in claim 1 wherein said sport ball is a volleyball or soccer ball.

10. An inflatable sport ball as recited in claim 4, wherein a first type or thickness of said energy absorbing foam includes a portion that covers the integral pump, and a second type or thickness of said energy absorbing foam includes a portion that covers an area of the sport ball other than the integral pump.

11. An inflatable sports ball comprising:
    an internal pump, said pump including means for actuating said pump and wherein said pump includes means for pumping ambient air into said ball and means for preventing said pumped air from escaping out of said ball, wherein said pump is attached to the ball and is located in an opening in the ball such that said opening is covered when the ball is not in use and further wherein said pump is essentially flush with or below the surface of the ball when not in use; and
    a first layer of energy absorbing foam on a first location of the ball, said layer having a predetermined type or thickness.

12. An inflatable sport ball as recited in claim 11, wherein said ball includes a second layer of energy absorbing foam.

13. An inflatable sport ball as recited in claim 12, wherein the first layer of foam and second layer of foam are configured to absorb different amounts of energy.

14. An inflatable sport ball as recited in claim 12, wherein the first layer of energy absorbing foam includes a portion that covers the internal pump, and the second layer of foam includes a portion that covers an area of the sport ball other than the internal pump.

15. An inflatable sport ball as recited in claim 11 wherein said ball includes a second layer of energy absorbing foam on a different location of the ball, said second foam layer having a different type or thicknesses of foam than the first foam layer.

16. An inflatable sport ball as recited in claim 11 wherein said sport ball is a basketball, volleyball, football, playground ball, or soccer ball.

17. An inflatable sport ball comprising an integral pump, wherein said pump is inside said ball and includes means selectively extendable outside of said bail for actuating said pump, and further wherein said pump is essentially flush with or below the surface of the ball when not in use; and
    a first layer of energy absorbing foam on a first location of the ball, said layer having a predetermined type or thickness.

18. An inflatable sport ball as recited in claim 17, wherein said ball includes a second layer of energy absorbing foam.

19. An inflatable sport ball as recited in claim 18, wherein the first layer of foam and second layer of foam are configured to absorb different amounts of energy.

20. An inflatable sport ball as recited in claim 18, wherein the first layer of energy absorbing foam includes a portion that covers the integral pump, and the second layer of foam includes a portion that covers an area of the sport ball other than the integral pump.

21. An inflatable sport ball as recited in claim 17, wherein said ball includes a second layer of energy absorbing foam on a different location of the ball, said second foam layer having a different type or thicknesses of foam than the first foam layer.

22. An inflatable sport ball as recited in claim 17, wherein said sport ball is a basketball, volleyball, football, playground ball, or soccer ball.

23. An inflatable sport ball comprising a carcass and an internal pump attached to said carcass, said pump including a cylinder having an air outlet into said ball, a one-way valve attached to said air outlet permitting air flow from said cylinder into said ball and preventing air flow from said ball back into said cylinder, a piston in said cylinder operable to draw ambient air from outside said ball into said cylinder and to force said drawn ambient air from said cylinder through said one-way valve into said ball and further including means for actuating said piston from outside said carcass, wherein said means for actuating said piston comprise a piston rod attached to said piston and extending through an opening in said carcass and movable between an extended position and an inserted position and further including a spring positioned to force said piston up in said cylinder away from said air outlet and force said piston rod to said extended position outside of said ball through said opening whereby said piston rod may be actuated and including means for locking said piston rod in said inserted position; and a first layer of energy absorbing foam on a first location of the ball, said layer having a predetermined type or thickness.

24. An inflatable sport ball as recited in claim 23, wherein said ball includes a second layer of energy absorbing foam.

25. An inflatable sport ball as recited in claim 24, wherein the first layer of foam and second layer of foam are configured to absorb different amounts of energy.

26. An inflatable sport ball as recited in claim 24, wherein the first layer of energy absorbing foam includes a portion that covers the internal pump, and the second layer of foam includes a portion that covers an area of the sport ball other than the internal pump.

27. An inflatable sport ball as recited in claim 23, wherein said ball includes a second layer of energy absorbing foam on a different location of the ball, said second foam layer having a different type or thicknesses of foam than the first foam layer.

28. An inflatable sport ball as recited in claim 23, wherein said sport ball is a basketball, volleyball, football, playground ball, or soccer ball.

* * * * *